United States Patent [19]

Büchler

[11] Patent Number: 4,695,210
[45] Date of Patent: Sep. 22, 1987

[54] APPARATUS FOR THE MACHINING OF WORKPIECES

[75] Inventor: René Büchler, Sonnental, Switzerland

[73] Assignee: Büchler G-Set A.G., Flawil, Switzerland

[21] Appl. No.: 821,233

[22] Filed: Jan. 22, 1986

[30] Foreign Application Priority Data

Jan. 22, 1985 [CH] Switzerland ............................ 279/85

[51] Int. Cl.⁴ .............................................. B23Q 3/06
[52] U.S. Cl. .................................. 409/219; 83/466.1; 269/87.2
[58] Field of Search ............... 409/131, 132, 219, 225; 408/1, 701, 72 R, 87, 67; 83/466.1; 29/423; 269/87, 87.1, 87.2, 87.3, 45; 266/65

[56] References Cited

U.S. PATENT DOCUMENTS

| | | | |
|---|---|---|---|
| 2,000,239 | 5/1935 | Linn | 269/87 |
| 2,421,957 | 6/1947 | Mead | 409/225 |
| 3,199,860 | 8/1965 | Moberg | 269/87.2 |
| 3,338,757 | 8/1967 | Dodge et al. | 266/65 X |
| 4,005,635 | 2/1977 | Feldcamp | 409/132 |
| 4,382,590 | 5/1983 | Pandya et al. | 269/87.2 |

FOREIGN PATENT DOCUMENTS

| | | | |
|---|---|---|---|
| 96344 | 12/1983 | European Pat. Off. | 83/466.1 |
| 2325262 | 11/1973 | Fed. Rep. of Germany | 83/466.1 |
| 2303842 | 8/1974 | Fed. Rep. of Germany | 269/87.2 |
| 2522750 | 12/1976 | Fed. Rep. of Germany | 83/466.1 |
| 3238809 | 4/1984 | Fed. Rep. of Germany | 83/466.1 |
| 146409 | 11/1981 | German Democratic Rep. | 269/87.2 |

Primary Examiner—William R. Briggs
Attorney, Agent, or Firm—Wegner & Bretschneider

[57] ABSTRACT

A retaining member which bridges the interface in a workpiece being machined is described. The retaining members are designed as a bridge, it being possible for one end portion of this bridge to be fixed on the waste piece (11) and the other end portion of this bridge to be fixed on the remaining piece. The respective retaining members may be connected to the workpiece parts utilizing magnetic force or a partial vacuum, by soldering, adhesion, hard soldering, welding, screwing, riveting, clamping or by using double-sided adhesive tape. With the aid of such an apparatus, the parts of a workpiece to be separated from each other may be held in their original position long enough for the cutting operation to be completed.

9 Claims, 16 Drawing Figures

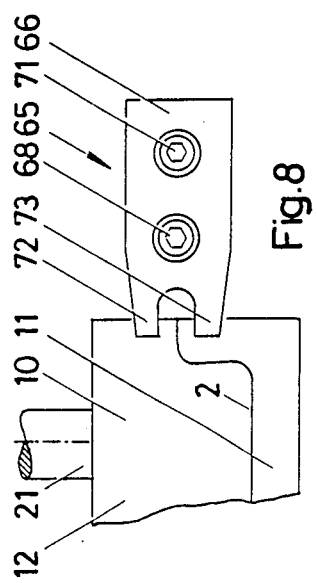
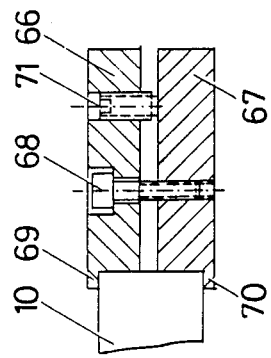
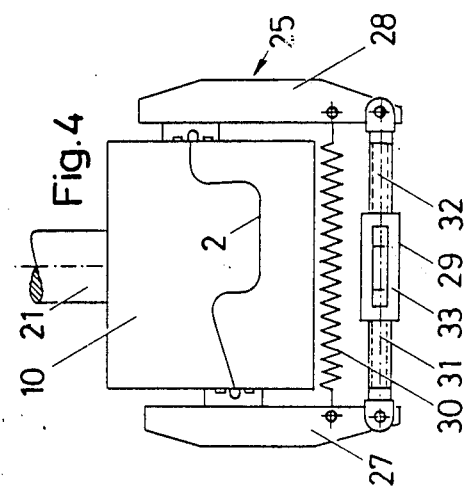
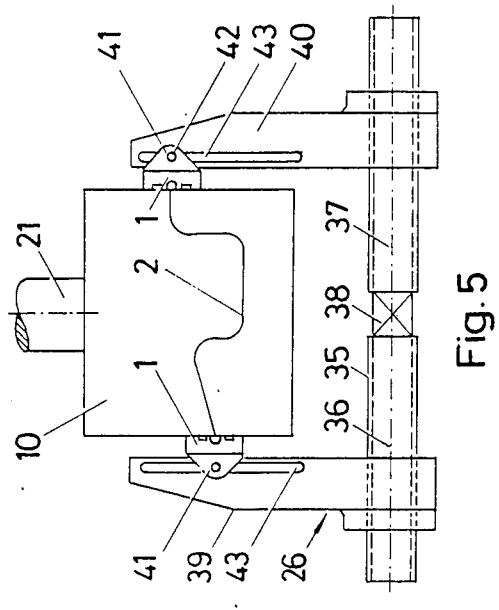
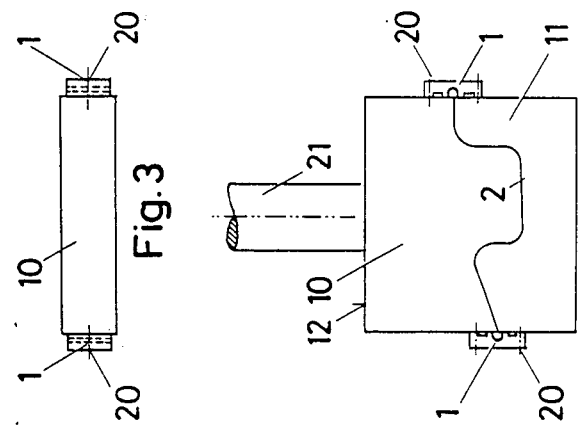
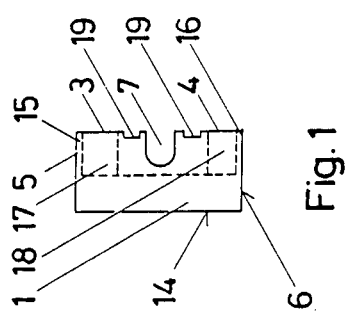

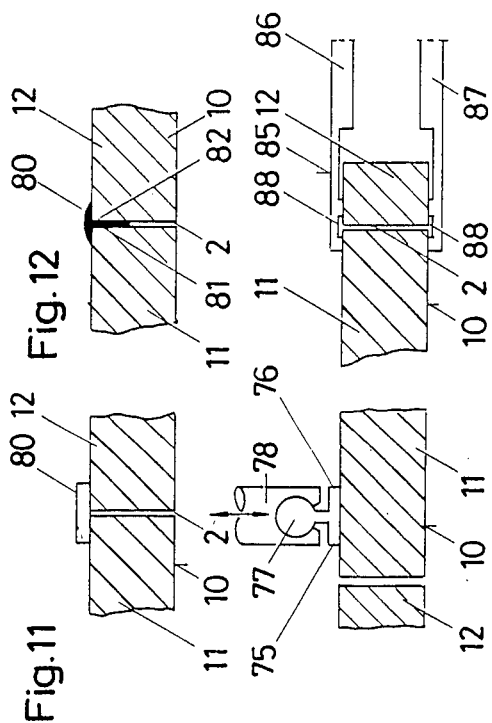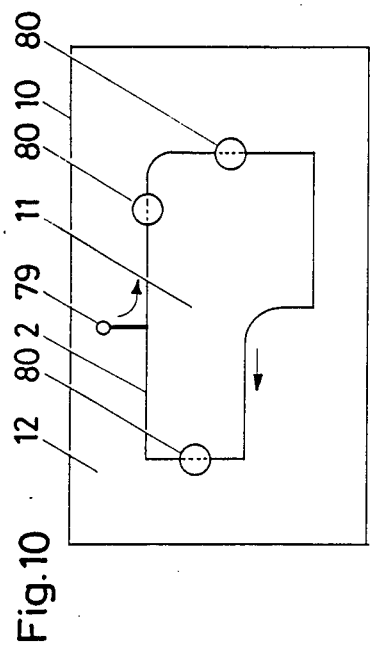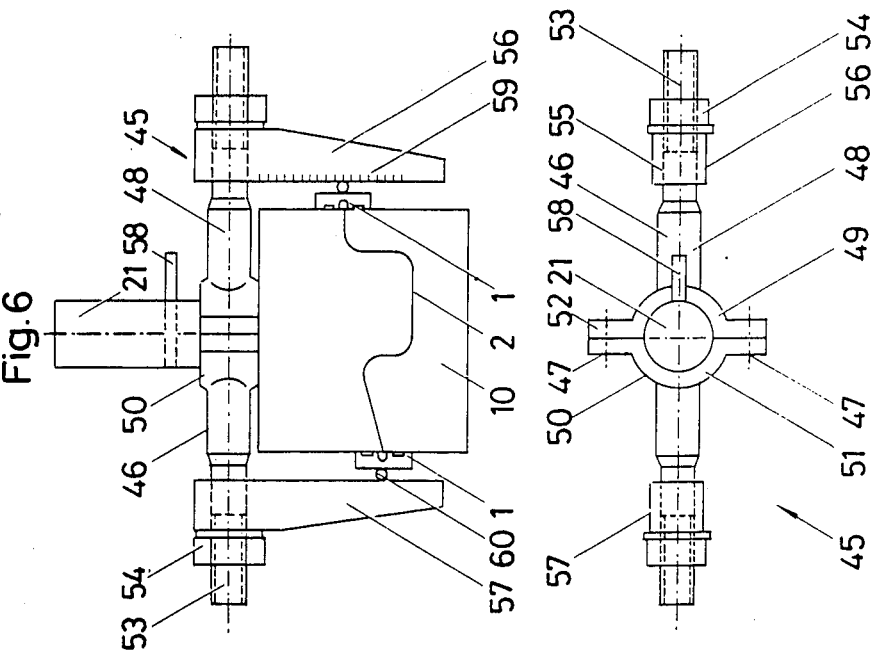

APPARATUS FOR THE MACHINING OF WORKPIECES

BACKGROUND OF THE INVENTION

The present invention relates to an apparatus for the machining of workpieces.

In the machining of workpieces, the problem of retention of the part too be separated from the remaining part of the workpiece often arises. This is because the part of the workpiece to be separated can move during the separating operation and may thereby affect the tool. The consequence is that the product from such a machining process does not have precisely the form or dimensions which are to be achieved. Such problems occur, for example, in countersining and cutting erosion, laser cutting, flaming, plasma cutting, milling, etc.

In the machining workpieces by wire erosion using a wire electrode, the problem of retention of the part separated from the remaining part of the workpiece has so far not been solved satisfactorily. The unretained waste piece separated from the remaining workpiece can, as mentioned, move and the form of the cutting surfaces may be adversely affected thereby. If a workpiece is to be separated into two or more parts, it is difficult in general to control the part to be separated such that it maintains precisely the same position with respect to the remaining workpiece during the advance of the wire electrode.

The situation is even more difficult if a part is to be maintained out of the interior of a workpiece. In such cases, the position of the waste piece is often secured with the aid of guide plates before the cut is completed. These plates are inserted manually into the gap, already formed by the tool. Only then is the cut completed. The machining process by the tool must thus be stopped to allow the guide plates to be inserted into the cutting gap. For understandable reasons, such manual operations are hardly compatible with a numerically controlled machining process. In the machining of a series of workpieces, quite considerable idle times of the processing machine may be caused by this.

The object of the present invention is to provide an apparatus for the machining of workpieces which provides means for eliminating the disadvantages mentioned above.

SUMMARY OF THE INVENTION

The foregoing and other objects are obtained in an apparatus for machining workpieces which includes a retention means for the part of the workpiece to be separated from the remainder. The retention means is at least fixed to the portion of the workpiece to be separated.

BRIEF DESCRIPTION OF THE DRAWINGS

Exemplary embodiments of the present invention are explained in more detail below with reference to the enclosed drawings, in which:

FIG. 1 shows in plan view a first embodiment of the means of retention according to the invention, FIG. 2 shows in plan view a workpiece to which two means of retention according to FIG. 1 are attached, FIG. 3 shows in front view the workpiece from FIG. 2, FIG. 4 shows in plan view a clamping device with the aid of which the means of retention in accordance with FIG. 1 can be pressed against a workpiece, FIG. 5 shows in plan view a clamping device as in FIG. 4, the limbs of which are provided with longitudinal slits for displacing the means of retention, FIG. 6 shows in plan view the clamping device in accordance with FIG. 4, which is provided with a shank, FIG. 7 shows in rear view the device in accordance with FIG. 6, FIG. 8 shows in plan view a second embodiment of the means of retention according to the invention, FIG. 9 shows in a vertical section the means of retention in accordance with FIG. 8, FIG. 10 shows in plan view a workpiece with indicated cut, which is complete in itself, FIG. 11 shows in a side view a third embodiment of the means of retention according to the invention, FIG. 12 shows in a side view of fourth embodiment of the means of retention according to the invention, FIG. 13 shows in a side view a fifth embodiment of the means of retention according to the invention, FIG. 14 shows in a side view a sixth embodiment of the means of retention according to the invention.

DESCRIPTION OF THE PREFERRED EMBODIMENTS

Figure 15:
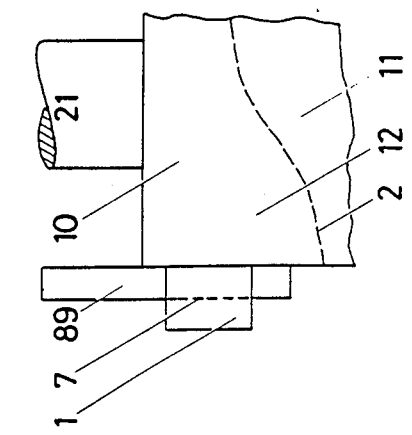
FIG. 15 shows in a plan view another possible use of the means of retention in accordance with FIG. 1.

The apparatus for the machining of workpieces according to the invention has at least one means of retention which holds together the parts of a workpiece to be separated or already separated from each other in an unchanged position relative to each other until the respective cutting operation is completed. This, means of retention may be fixed on at least one of the parts of the workpiece. In the following, that part of a workpiece which is to be separated from the remaining part of the workpiece, i.e., from the remaining workpiece, is referred to as a waste piece.

The means of retention may be attached to a workpiece in two ways. Firstly, it may be attached such that it does not cover the projection of the cut through the workpiece into the datum plane of the apparatus. This means that the means of retention lies outside the cut. Secondly, the means of retention may cover the projection of the cut, in which case it may even lie partially in the cutting gap. In the following, means of retention of both these types are described.

FIG. 1 illustrates a first embodiment of the means of retention 1 of the present apparatus, in plan view. Bridge-like retaining member 1 belongs to that group of the means of retention groups mentioned which do not cover the projection of the cut 2 (FIG. 2) into the datum plane of the apparatus. Retaining member 1 has substantially the form of a bridge, the base area 3 or 4 of the end portions 5 and 6, respectively, of this bridge 1 being intended for resting on the workpiece 10 (FIG. 2). One end portion 6 of this bridge 1 may be fixed by its base area 4 on the waste piece 11, while the base area 3 of the other end portion 5 of the bridge 1 may rest on the remaining workpiece 12. Between the end portions 5 and 6 there is a recess 7 which opens outwardly of the bridge. Two bridges 1 (FIG. 2) are attached on the side areas of the workpiece 10 and therefore they belong to that group of means of retention which do not cover the projection of the cut 2 into the datum plane of the apparatus.

The bridge-like retaining member 1 may be made of various materials.

Metals such as steel, brass or the like can be used. Furthermore, such a bridge may also be made of plastic. However, a bridge may also be made of combination of materials, such as metal and plastic for example, as dictated by the strength requirements for the bridge.

The bridges 1 must be fixed on the workpiece 10 such that they can retain the parts 11 and 12 of the workpiece 10 in unchanged position relative to each other until completion of the cutting operation. This fixing may be performed utilizing magnetic force or a partial vacuum, by soldering, adhesion, hard soldering, welding, screwing, riveting, clamping or using double-sided adhesive tape.

The retaining member 1 illustrated in FIG. 1 is designed such that it can be fixed on the workpiece 10 utilizing magnetic force or by adhesion, soldering, etc. The retaining member 1 has a basic body 14 which is approximately cuboid and from which limbs 15 and 16 project. The limbs 15 and 16 are relatively thin, they project from the basic body 14 in the same direction and they represent a component part of the respective end portion 5 and 6 of the bridge 1. Magnets 17 and 18 are assigned to each inner side of limbs 15 and 16, respectively. At least one of the poles N and S of these magnets 17 and 18 must be located in the region of the base area 3 or 4, respectively.

If the bridge 1 contains magnets 17 and 18, the basic body 14 is advantageously made of metal, so that it may form the yoke for the magnets 17 and 18. The magnetic flux path is then completed through the workpiece 10.

The recess 7 in the retaining member 1 also serves as an opening, through which the wire electrode is threaded before the actual cutting operation begins.

In the event that the retaining member 1 is to be attached by adhesion, soldering, etc., on the workpiece 10, the base areas 3 and 4 of the bridge 1 have indentations 19, in which any surplus binder there may be between the surface of the workpiece 1 and the base areas 3 and 4 may be accommodated.

In FIG. 2 it is indicated that the bridges 1 may also be fixed on the workpiece 10 with the aid of screws 10. Each end portions 5 and 6 of the bridge 1 is provided with a continuous bore, through which a screw 20 passes in each case. These screws 20 are screwed into the workpiece. Since the respective end portions 5 and 6 lie on either side of the cut 2, the screws 20 are screwed into the workpiece 10 on either side of the cut 2. It is also evident from FIG. 2 that attached on the workpiece 10 is a shank 21, which is intended for connecting the workpiece 10 to auxiliary devices (not shown) which make it possible to retain the workpiece in a suitable position for machining the same.

FIGS. 4 and 5 show two further embodiments of the present apparatus, in which the retaining members 1 are pressed against the side areas of the workpiece 10 with the aid of clamping devices 25 and 26, respectively. The clamping device 25 according to FIG. 4 has two limbs 27 and 28 which are hinged at one end at the ends of a web 29 of adjustable length. In parallel to the web 29 extends a tension spring 30 between the limbs 27 and 28. The inner side of the limbs 27 and 28 rests on the retaining member 1 and presses the same against the workpiece 10. The web 29 has two screws 31 and 32 with right-hand or left-hand thread, the heads of which are forked so that one of the limbs 27 or 28 may be hinged on the respective head. The bolts of the screws 31 and 32 are connected to each other with the aid of a final control element 33. This final control element 33 is designed as a nut and counternut or a turnbuckle.

In the clamping device 26 in accordance with FIG. 5, the web 35 consists of two coaxially arranged screws 36 and 37, which are connected to each other by means of a shaped piece 38. Seated on the respective screw 36 or 37 is a limb 39 and 40 respectively of the clamping device 26, which push the retaining member 1 against the workpiece 10. In the example illustrated, the rear side of the respective retaining member 1 is provided with fork-shaped projections 41, in which openings are made. Passing through these openings are pins 42 which extend through a slit 43, which is made in the respective limb 39 and 40 and which extends in the longitudinal direction of the respective limb. If a suitable instrument is used on the shaped piece 38, the distance between the limbs 39 and 40 may be altered. On account of the pins 42, the retaining member 1 cannot drop off the limbs 39 and 40 and so the means of retention can be attached quickly and precisely on the respective workpiece 10.

FIGS. 6 and 7 show a further embodiment of the clamping device 45. The web 46 consists of a two-substantially indentically designed halves, which are connected to each other with the aid of screws 47. The respective web half includes a basic part 48, to which one half 49 or 51 of an eyelet 50 connects. These eyelet halves 49 and 51 are connected to each other with the aid of the screws 47, which pass through flanges 52 on the eyelet halves 49 and 51. The diameter of the eyelet 50 is chosen such that, when the screws 47 are tightened, the eyelet 50 is seated securely on the shank 21, which bears a stop pin 58. The surface of the eyelet 50 facing the workpiece 10 may serve as a stop for the workpiece 10.

The other end portion of the basic part 48 of the web half runs out into a screw section 53 and on this section 53 is a nut 54. Between the basic part 48 and the nut 54 is the eye 55 of limbs 56 and 57. The inner areas of the limbs 56 and 57 run parallel to each other and a scale 59 on the respective limb 56 or 57 is assigned to each of these areas. Between the respective limb 56 or 57 and the retaining member 1 there is a connection 60 which permits a swivel movement of the retaining member 1 with respect to the limb 56 or 57, respectively, assigned to said means of retention. This connection 60 is located approximately in the middle of the length of the bridge 1. The said connection 60 ensures that the bridge 1 is pressed against the workpiece 10 with the same force over its entire length.

FIGS. 8 and 9 show a further embodiment of the means of retention according to the invention 65, which does not cover or bridge the cut 2. This includes two halves 66 and 67 which are arranged one above the other and are pressed against each other with the aid of a screw 68. One end portion of these clamp halves 66 and 67 is offset so that these end portions of the clamp halves 66 and 67 have claws 69 and 70 between which the workpiece 10 can be clamped.

So that the clamp halves 66 and 67 lie approximately parellel each other, the opposite end portion distance screw is screwed into the upper clamp half 66 and it presses onto the lower clamp 67. The end portions of the clamp halves 66 and 67 having the claws 69 and 70 are forked, so that each of the halves 66 and 67 has fork ends 72 and 73. The clamp 65 is attached on the workpiece 10 such that the interface 2 is located between the fork ends 72 and 73.

Another further embodiment of the means of retention not covering the cut is illustrated in FIG. 13. This means of retention 75 has a lower, flat part 76 of this connecting piece 75 is likewise temporarily fixed in a way known per se, for example on the waste piece 11. The upper, approximately bore-shaped part 77 of this retaining member 75 is positively connected to a removal device 78, with the aid of which the waste piece 11 may be removed from the apparatus. Thereafter, the connecting piece 75 is detached from the waste piece 11.

FIG. 10 illustrates a workpiece 10 in which a cut 2, which is complete in itself, is made. Such a cut may be made with the aid of a wire electrode (not shown) if electroerosion is used for machining of the workpiece. The wire electrode is first threaded through a preliminary bore 79 and then the cut 2 is made in the direction indicated by arrows. After the electrode has covered a certain section of the cut, retaining member 80, which covers the cut 2, may be applied onto or also into the cut. FIGS. 11 and 12 show such a retaining member which may be located on the upper side or/and underside of the workpiece 10.

According to FIG. 11, this may be a disc from a material adhering temporarily, but nevertheless well, on the material of the workpiece 10. The choice of this material depends greatly on the material of the workpiece. As emerges from FIG. 12, the material of the retaining member 80 may be plastic to fluid, so that it not only rests on the edges 81 and 82 of the cut 2, but it even penetrates into the cutting gap 2 in the workpiece 10 where it bonds with the material of the walls of the gap and hardens.

FIG. 14 shows a further possible embodiment of a means of retention according to the invention 85. This consists of an upper limb 86 and a lower limb 87 which are introduced with the aid of a device which is not shown but which is known per se into the region of the cut already made. This device also ensures that the limbs 86 and 87 are moved relative to each other such that they cover the cut 2 at the top and bottom. This achieves that the waste piece 11 remains in an unchanged position relative to the remaining workpiece 12 until completion of the cut 2. The contact area of the limbs 86 and 87 is provided in the region of the cut 2 with a recess 88, in which any dirt can collect.

FIG. 15 illustrates a further possible use of the invention. It may be attached in the corner of the workpiece 10. Lying in the convexity 7 of the bridge 1 is a bolt 89, the form of which is chosen such that it is pressed by the convexity 7 against the side wall of the workpiece 10 without play. The embodiment of the bridge 1 having the magnets 17 and 18 is advantageously used for this purpose. Since the position of the bolt 89 on the workpiece 10, and thus also relative to the cut 2 to be made, can be determined in advance, the bolt 89 may mark the starting point for the implementation of the program controlling the cut 2. A particularly advantageous effect in the case of such a means of marking 80 results from the circumstance that the cylinder-shaped surface of the bolt 89 can only form puntiform contact with the wire electrode, so that the starting point of the machining operations may be marked extremely precisely.

Figure 16:
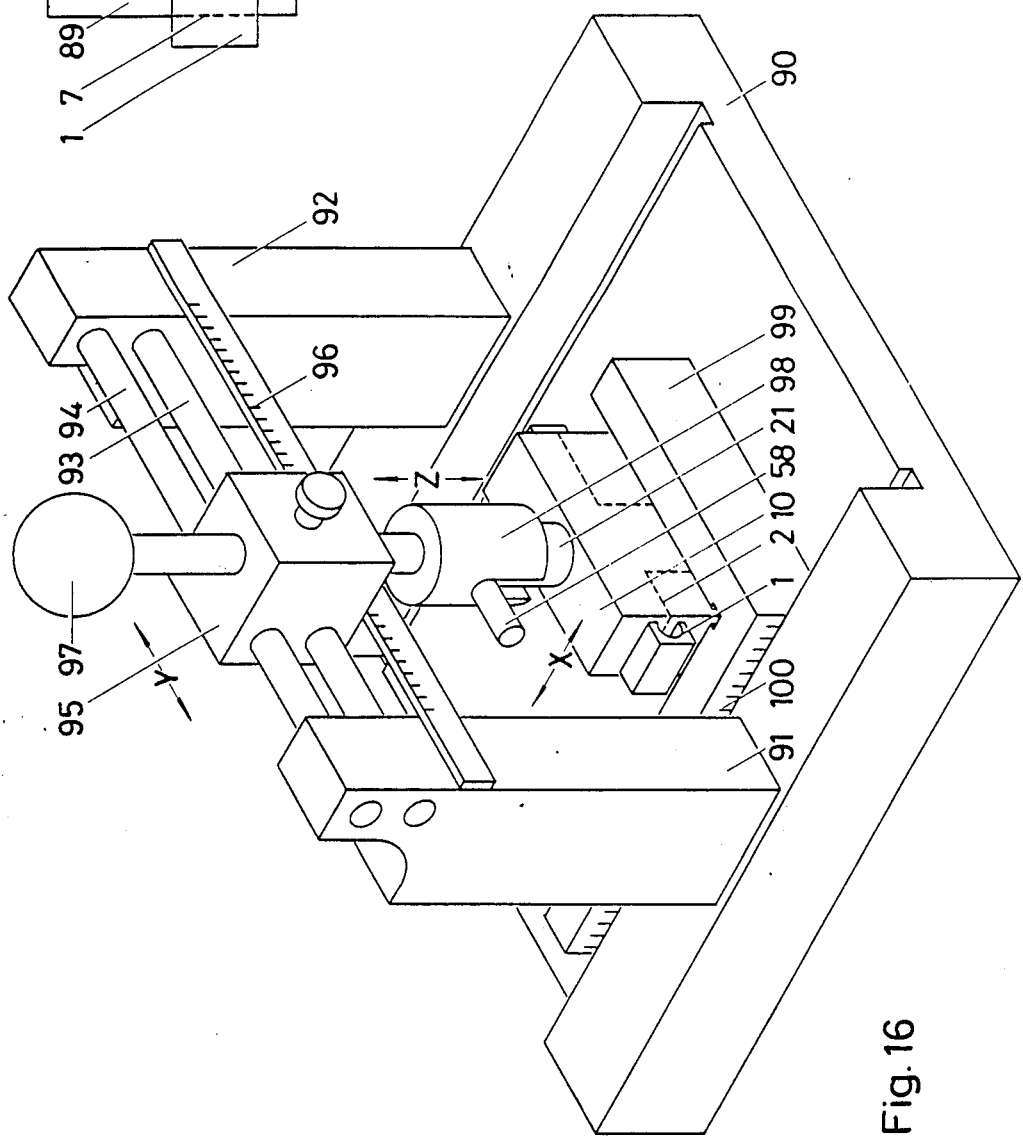
FIG. 16 shows perspectively a device for the positioned attachment of the means of retention of the shank on a workpiece.

FIG. 16 shows a device which mades possible a precisely positioned and nevertheless not unreasonably time-consuming fixing of the shank 21 and of the means of retention of the workpiece 10 if they are to be fixed on the workpiece by soldering, adhesion etc. This device has a base plate 90, on which a frame with a guide-unit is arranged. Between the columns 91 and 92 of the frame extend cross-members 93 and 94, which lie one above the other and are intended for guidance of a rider 95. Underneath the cross-members 93 and 94 is a scale 96, which indicates the position of the rider 95 in the transverse direction. Passing through the rider 95 is a rod 97, the bottom end of which bears a receiving device 98 for the shank together with the stop pin 58. Lying on the base plate 90 underneath the guide unit is a back square 99, which is movable on the base plate 9—perpendicular to the direction of movement of the rod 97. The limb of the back square 99 lying in the longitudinal direction of the base plate 90 is provided with a scale 100.

As indicated by broken lines in FIG. 16, the columns 91 and 92 of the frame may be provided with horizontally arranged, spring-loaded rods, which are directed against the side areas of the workpiece 10. Between the workpiece 10 and the inner end of the horizontal rods may be arranged those means of retention 1 which are to be attached on the side areas of the workpiece 10. The spring of each rod which passes through the right post 92 should be able to exert a stronger pressure on the inner end of the horizontal rod than the spring of the other horizontal rod, so that the workpiece 10 lies correctly in the back square 99. A heating device (not shows) may also be provided in the base plate 90.

The workpiece 10 is placed in the back square 99 and the square 99 is moved in the longitudinal direction X of the base plate 90 until the rod 97 is located with the shank 21 over the point where the latter is to be fixed on the workpiece 10. Then the position of the rod 97 can also be adjusted in the transverse direction Y by the movement of the rider 95 along the cross-members 93 and 94. Hereafter, the shank 21 is lowered onto the workpiece 10, with interposing of a suitable banding agent and is retained in this position until the banding agent sets. At the same time as the shaft 21, the means of retention of the workpiece 10, to be precise, positioned at the ends of the intended cut 2. The process of the actual fixing of the means of retention 1 on the workpiece 10 depends on the choice of the banding agent.

The foregoing description of certain preferred embodiments of the invention is intended only to be exemplary of the principles of the invention. These embodiments can be modified or changed which remaining within the spent and scope of the invention as defined in the appended claims.

What is claimed is:

1. In an apparatus wherein a workpiece affixed for support at a supporting means of the apparatus is subjected to a machining process for separating said workpiece into a waste piece and a remaining piece, whereby when said machining is completed only said remaining piece is kept affixed for support at the supporting means, the improvement comprising at least one pair of retention means cooperating with each other for retaining said waste piece unmovably positioned with respect to said remaining piece, each retention means comprising attachment means for attaching a first portion of said retention means to said remaining piece for supporting said retention means at said remaining piece and attachment means for attaching a second portion of said retention means to said waste piece for supporting said waste piece at said retention means, wherein when said machining is completed said waste piece and said remaining piece have respective surfaces facing each other and defining between them a machining space, and each said retention means is shaped for bridging said machining space, said retention means comprising substantially the sole support for said workpiece during the machining process.

2. The apparatus of claim 1, wherein said bridge-shaped retention means has said first portion thereof attached to said remaining piece and said second portion thereof attached to said waste piece, and further has a middle portion thereof provided with a recess facing said machining space.

3. The apparatus of claim 2, wherein said first and second portions of said retention means have roughened surfaces, and further comprising a pressing device for pressing said roughened surfaces onto a respective surface of the said waste piece and of said remaining piece.

4. The apparatus of claim 1, wherein said retention means comprises two halves and a clamping screw means and is adapted for clamping said waste piece on respective sides thereof and said remaining piece on respective sides thereof by means of clamping portions of said halves, said clamping portions having a forked shape for bridging said machining space.

5. The apparatus of claim 1, wherein said second portion of said retention means attached to said waste piece comprises a connecting piece having an end adapted to be affixed to a removal device for providing a removal of said waste piece when wholly separated from the workpiece.

6. The apparatus of claim 1, wherein said retention means is made of adhesive material.

7. The apparatus of claim 1, wherein said retention means comprises two limb-like parts resting on respective sides of said waste piece and of said remaining piece.

8. The apparatus of claim 1, further comprising a device for attaching said retention means to said remaining piece and to said waste piece, said device being designed as a press in which the workpiece is positioned precisely, a respective layer of bonding material being interposed between the workpiece and said attachment means.

9. The apparatus of claim 1, further comprising bolt means adapted to be clamped between said retention and the workpiece for marking a starting point of said machining process.

* * * * *